Dec. 26, 1933.  F. C. JONES ET AL  1,940,754
APPARATUS FOR FORMING FLANGED BEARINGS AND THE LIKE
Filed March 21, 1932  4 Sheets-Sheet 3

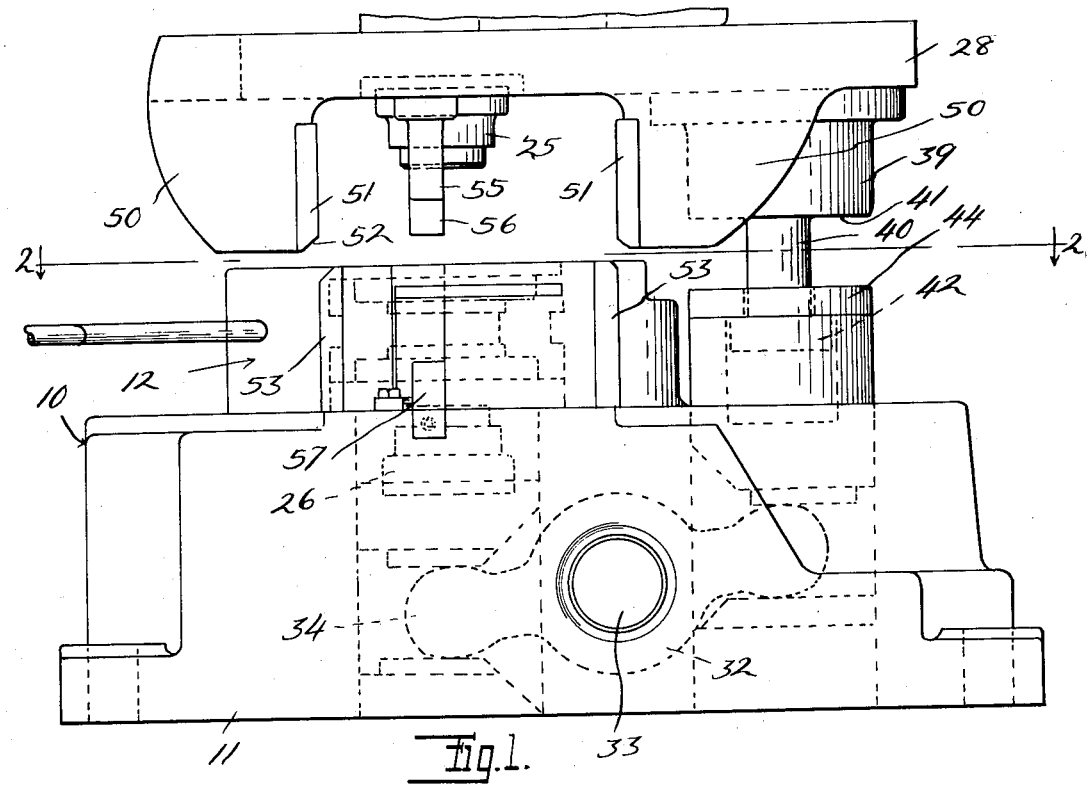
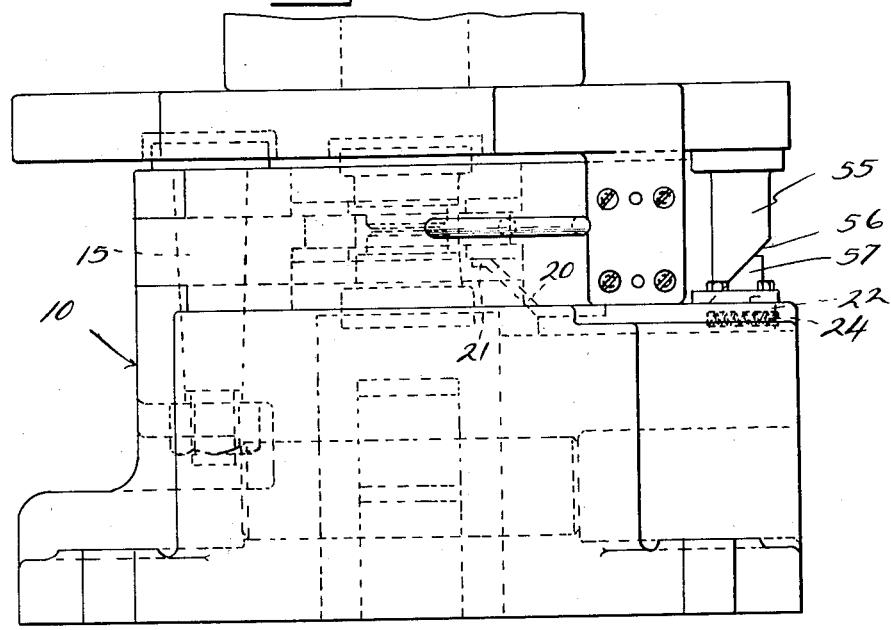

INVENTORS
Fred C. Jones
Richard W. Funk
BY Whittemore Hulbert
Whittemore & Belknap
ATTORNEYS Dec. 26, 1933.   F. C. JONES ET AL   1,940,754
APPARATUS FOR FORMING FLANGED BEARINGS AND THE LIKE
Filed March 21, 1932   4 Sheets-Sheet 4

INVENTORS
Fred C. Jones
Richard W. Funk
BY Whittemore Hulbert
Whittemore & Belknap
ATTORNEYS Patented Dec. 26, 1933

1,940,754

UNITED STATES PATENT OFFICE 1,940,754

APPARATUS FOR FORMING FLANGED BEARINGS AND THE LIKE

Fred C. Jones and Richard W. Funk, Detroit, Mich., assignors to Bohn Aluminum & Brass Corporation, Detroit, Mich., a corporation of Michigan Application March 21, 1932. Serial No. 600,328

19 Claims. (Cl. 153—25)

This invention relates generally to punch presses and refers more particularly to apparatus of this character especially designed for use in the manufacture of tubular structural shapes. Although the present invention may be utilized to advantage in the manufacture of various types of structural shapes, nevertheless, it finds particular utility when employed in the manufacture of bushings or bearings having radial flanges at the opposite ends thereof, and to this end the invention contemplate simplifying and reducing the cost of manufacture of articles of the above character by providing a punch press capable of readily shaping the ends of the aforesaid articles to form radial flanges.

A further advantageous feature of the present invention which contributes materially to expediting production and cheapening the cost of manufacture resides in the provision of a punch press having cooperating punches movable into engagement with opposite ends of a tubular article positioned therebetween for simultaneously flanging opposite ends of the article.

A further object of the present invention resides in the novel means employed herein for rigidly clamping the articles to be fashioned in position relative to the punches prior to the punching operations.

A still further object of this invention resides in the provision of means for supporting an article to be fashioned in position relative to the clamping means prior to the clamping operation of the latter.

In addition to the foregoing, this invention contemplates the provision of a punch press having a single operating member connected to the punches, work positioning and clamping means for automatically operating all of the latter instrumentalities in timed relation to each other. This latter feature provides for reducing the number of parts of the apparatus to a minimum and as a consequence materially reduces the cost of this apparatus.

The foregoing as well as other objects will be made more apparent as this description proceeds, especially when considered in connection with the accompanying drawings, wherein:

Figure 1 is a side elevational view of a punch press constructed in accordance with this invention;

Figure 5 is an end elevational view of the press illustrated in Figure 1;

Figure 7 is a perspective view illustrating a blank bushing or bearing and the like prior to the punching operation; and Figure 8 is a view similar to Figure 7 showing the article after the punching operation.

Figure 2:
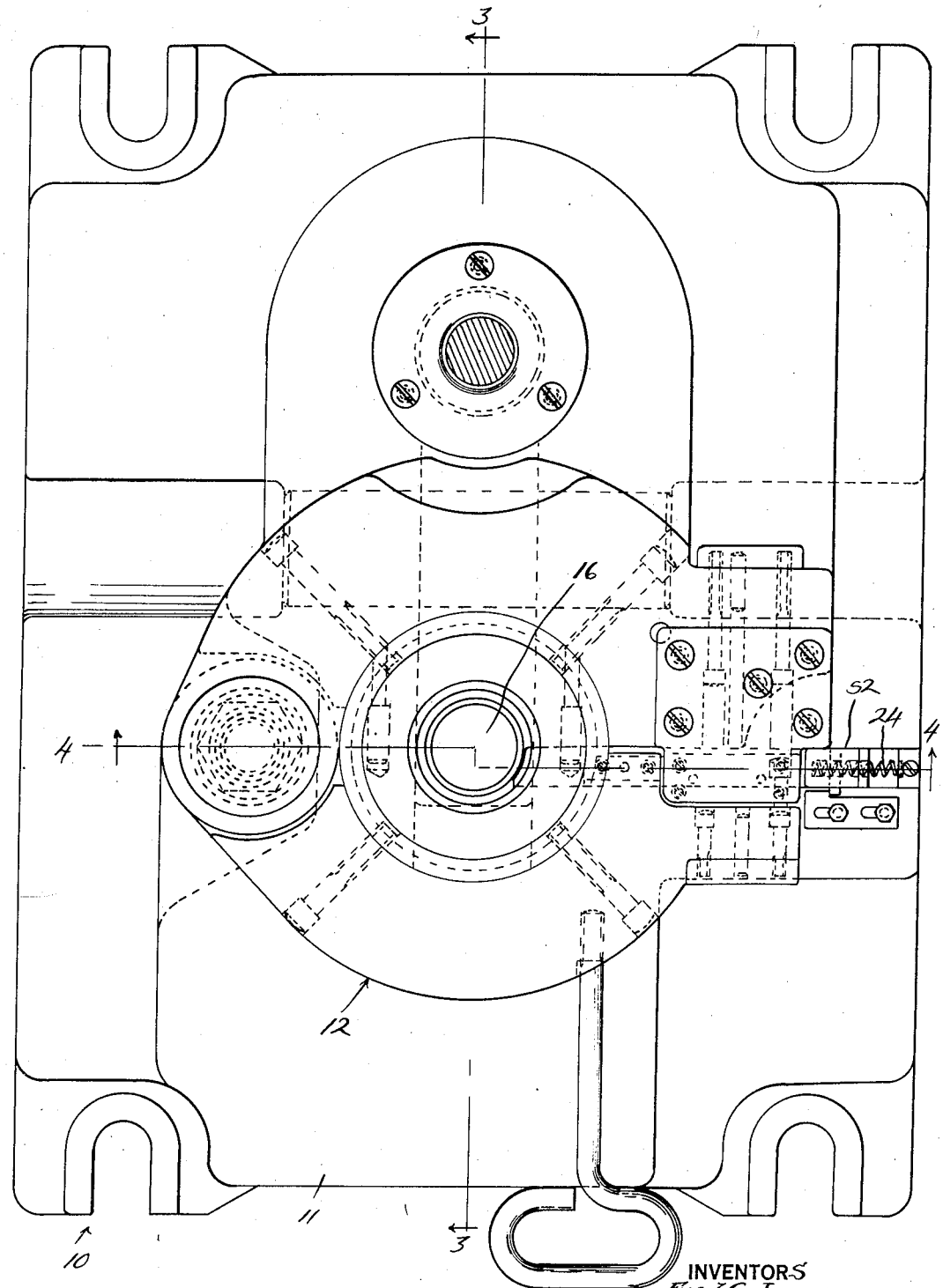
Figure 2 is a sectional view taken on the line 2—2 of Figure 1.
Figure 6:
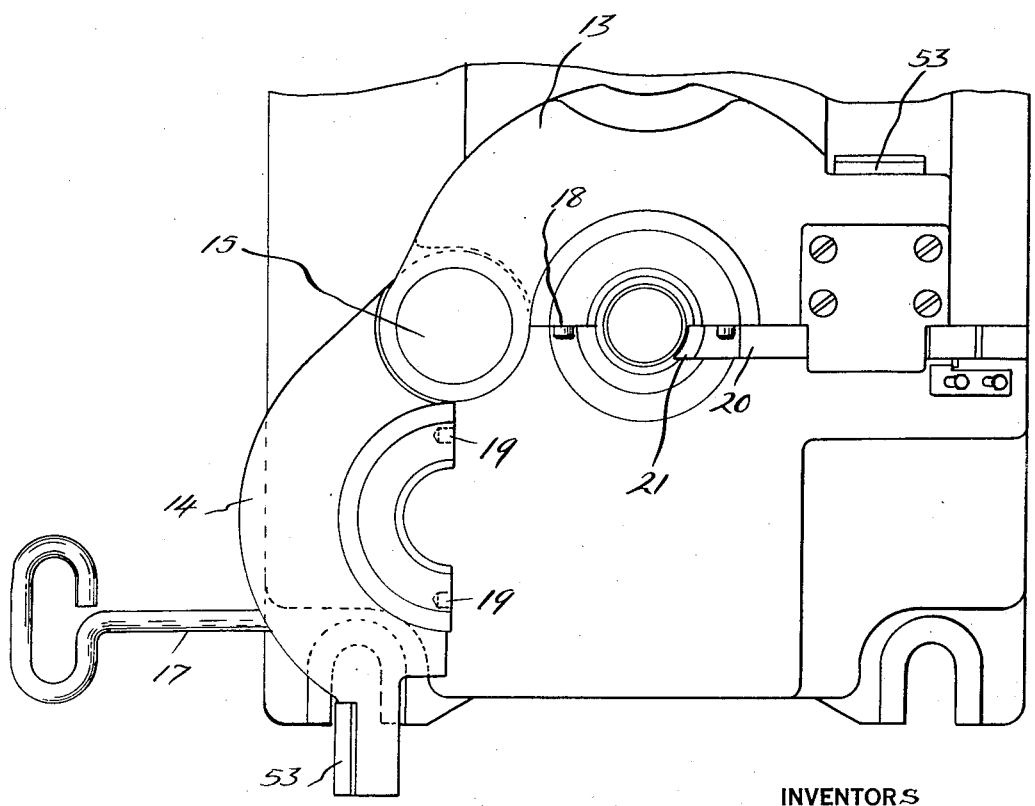
Figure 6 is a fragmentary plan view of the construction illustrated in Figure 2 showing the holding die in open position.

Referring now to the drawings, it will be noted that there is illustrated in Figure 1 a punch press 10 having a base 11 and a holder 12 supported upon the upper surface of the base. In the present instance, the holder 12 is designed to secure bearings or other circular objects in place during the punching operation and comprises a pair of sections 13 and 14 pivotally connected together as at 15 for swinging movement relative to each other. The section 13 is preferably rigidly secured to the base and is provided with a semicircular recess in the inner face thereof cooperating with a similar recess in the adjacent face of the swinging section 14, in the operative position of the latter shown in Figure 2, to form a bore 16 of sufficient dimension to embrace the central portions of a circular bearing or bushing blank for securing the same in position. The pivotal connection 15 between the sections 13 and 14 is such as to permit readily swinging the section 14 into and out of operative relationship to the section 13. As shown in Figure 6, when the section 14 is swung to its inoperative position, the section 13 is readily accessible so as to permit inserting and removing the bearing sections from the semicircular opening formed in the inner side thereof. Movement of the section 14 is preferably effected manually by means of a suitable handle 17 and registration of the semicircular recess in the latter section with the cooperating recess formed in the section 13 is insured by means of locating pins 18 secured to the inner face of the section 13 on opposite sides of the recess in the latter and engageable within suitable recesses 19 formed in the adjacent side of the section 14.

As stated above, a bearing or other tubular blank is inserted within the recess in the section 13 when the swinging section 14 is in its inoperative position shown in Figure 6, and, accordingly, means is provided herein for supporting and properly positioning the blank relative to the section 13. The foregoing is accomplished in the present instance by providing a finger 20 having a substantially flat supporting surface 21 positioned for engagement with a portion of the lower end of the blank projecting inwardly from the inner surface of the section 13. In other words, the finger cooperates with the side walls of the semicircular recess in the section 13 to support a bearing or like blank within the aforesaid recess without the assistance of the cooperating section 14. As will be observed from Figure 4, the supporting surface 21 of the finger 20 is arranged substantially flush with the lower end of the semicircular recess in the section 13, with the result that it performs the additional function of properly positioning the bearing or like blank axially relative to the holder. In this connection, it is to be noted that the finger 20 does not obstruct movement of the section 14 into operative position relative to the section 13. The finger 20 is mounted for sliding movement transversely of the axis of the bore 16 so as to permit the same to be moved from its operative position shown in Figure 4 to an inoperative position wherein the supporting surface 21 thereof is spaced outwardly from the side walls of the bore so as not to interfere with the punching operation to be presently described. For accomplishing the foregoing desired movement of the finger, the latter is secured to a plate 22 slidably mounted upon the base as at 23 and normally yieldably urged in a direction to position the supporting surface 21 of the finger in operative supporting relationship to the holder by means of a spring 24.

As previously stated, it is one of the principal objects of the present invention to simultaneously flange opposite ends of the bearing or like section while the same is supported in the holder and for accomplishing this result, we provide a pair of coaxially arranged dies or punches 25 and 26 disposed respectively above and below the holder in axial alignment with the bore 16 therethrough. The upper die 25 is rigidly secured as at 27 to a vertically reciprocable header 28 and the latter is in turn rigidly secured to a power operated plunger 29 for actuation thereby. In order to provide for simultaneous movement of both the punches 25 and 26 toward each other into engagement with opposite ends of the bearing or like section in the holder to flange the latter ends, we provide an operative connection between the lower punch 26 and the vertically reciprocable header 28.

The operative connection aforesaid comprises a slide 30 mounted for vertical sliding movement relative to the base 11 within a recess in the latter and having the lower punch 26 secured to the upper end thereof as at 31 so that upward movement of the slide will effect an engagement of the punch 26 with the lower end of the pushing or like section supported in the holder. In order to move the slide 30 upwardly relative to the base by the header 28 as the latter is moved downwardly to engage the upper die 25 with the corresponding end of the bushing or like section in the holder, a rocker 32 is pivotally connected intermediate the ends thereof as at 33 to the base. As shown particularly in Figure 3, one end 34 of the rocker 32 extends within a recess 35 formed in the slide 30, while the opposite end 36 of the rocker is adapted to extend within a corresponding recess 37 formed in a second slide 38. The slide 38 is reciprocably mounted within the base in the same manner as the slide 30 and has a lost motion connection with the head 28.

Figure 3:
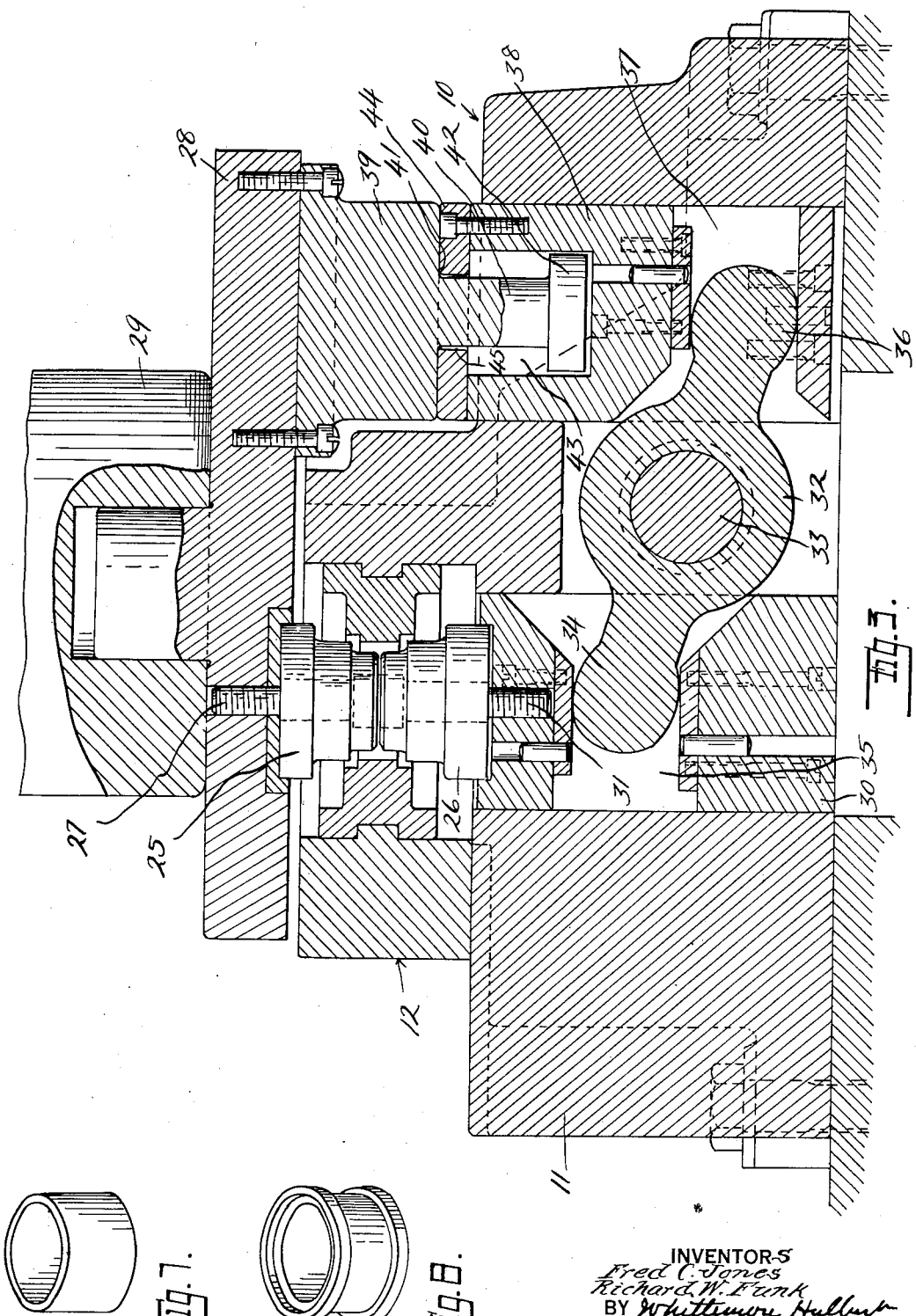
Figure 3 is a sectional view taken on the plane indicated by the line 3—3 of Figure 2.

Referring now more in detail to the particular connection between the head 28 and slide 38, it will be noted from Figure 3 that this connection comprises a plunger 39 depending from and secured to the header 28. The lower end of the plunger is provided with a reduced shank portion 40 forming an annular shoulder 41 and terminating in an enlarged head 42 adapted to reciprocate within a recess 43 formed in the upper end of the slide 38. The plunger 39 is held in assembled relation with the slide 38 by means of a wear plate 44 secured to the upper end of the slide 38 and having a reduced opening 45 therethrough of sufficient dimension to freely receive the reduced shank 40 of the plunger, but considerably smaller in diameter than the recess 43 in the slide, with the result that the portions of the wear plate surrounding the opening 45 therethrough forms an abutment for the head 42 upon upward movement of the plunger to effect a corresponding movement of the slide 38. The wear plate 44 being disposed between the shoulder 41 on the plunger and the top of the slide 38 also forms an abutment for engagement by the shoulder 41 upon downward movement of the head 28 to effect a corresponding downward movement of the slide 38.

It will be apparent from the foregoing that the lost motion connection between the head 28 and slide 38 provides for a predetermined movement of the head 28 and upper die 25 relative to the lower die 26 or, in other words, permits a limited downward movement of the die 25 prior to engagement of the shoulder 41 with the wear plate 44 to move the slide 38 downwardly and thereby effect an upward movement of the punch 26 through the intermediary of the slide 30 and rocker 32. It will be noted from Figure 1, however, that the die 25 is spaced a further distance away from the work holder than the lower die 26 and this distance is accurately predetermined with respect to the extent of lost motion provided between the holder 28 and slide 38 so that as the upper punch 25 approaches the work in the holder, movement will be imparted to the lower punch 26 for simultaneously moving the latter toward the work. Thus, the foregoing construction is such that the punches are moved simultaneously toward each other during the final working stroke of the head 28 to flange opposite ends of the bearing or like section clamped in the holder.

During the interval the head 28 is moved downwardly relative to the slide 38, the work supporting finger 20 is moved against the action of the spring 24 to its inoperative position and the swinging section 14 of the holder is rigidly clamped to the stationary section 13. Both the above functions are performed in timed relation by the head 28 prior to engagement of the punches 25 and 26 with the work in the holder 12. As shown particularly in Figure 1, the means on the head 28 for clamping the sections of the holder in operative relationship comprises a pair of laterally spaced projections 50 depending from the head 28 and having plates 51 suitably secured to the inner surfaces of the projections in cooperative relationship. The plates 51 are preferably formed of a material having relatively high wear resisting characteristics and the lower ends thereof are chamfered as at 52 to provide a lead to facilitate engagement of the inserts with corresponding plates 53 secured respectively to the swinging end of the section 14 and the corresponding end of the section 13. The distance between the inner surfaces of the plates 51 is accurately predetermined so that upon downward movement of the head 28, the plates 51 will engage over the plates 53 and rigidly clamp the swinging section 14 of the holder to the fixed section 13 thereof.

After the work has been clamped between the sections 13 and 14, the finger 20 is retarded or moved out of the path of travel of the lower punch 26. In order to retract the work supporting finger 20 upon downward movement of the head 28 prior to engagement of the punches with the work, the head 28 is provided with a depending cam member 55 terminating at the lower end thereof in an inclined cam face 56 adapted to engage a correspondingly inclined cam 57 fixed to the slide or plate 22. As will be observed from Figure 5 wherein the above construction is illustrated, the corresponding engaging faces of the cams 55 and 57 are inclined at an angle of substantially 45° so that downward movement of the cam 55 by the head relative to the cam 57 will cause the latter, together with the plate 22, to move outwardly relative to the spring 24 and since the finger 20 is fixed to the inner end of the plate as stated above, the same will be retracted from its operative position shown in Figure 4 to its inoperative position illustrated in Figure 5.

From the foregoing, it will be apparent that the lost motion connection hereinbefore described provides for movement of the work supporting finger 20 to its inoperative position and movement of the clamping means on the head into operative relationship with the sections of the holder to rigidly clamp the same together by the head 28 during the interval the latter is moved downwardly relative to the slide 38. With this arrangement, it will be apparent that the work will be rigidly clamped within the holder and the supporting finger 20 will be moved out of the path of travel of the punches 25 and 26 by the time the latter punches are moved by the head 28 into engagement with opposite ends of the work in the holder. It will further be observed upon viewing Figure 1 of the drawings that the relative positions of the cams 56 and 57 are so determined with respect to the position of the clamping plates 51 on the head that the sections of the holder are rigidly clamped together prior to retraction of the work supporting finger. In other words, the construction is such that upon initial downward movement of the head 28, the plates 51 engage the sections of the holder in such a manner as to rigidly clamp the same together and upon continued downward movement of the head 28 relative to the slide 38, the cams 55 and 57 move into engagement for retracting the finger 20.

Figure 4:
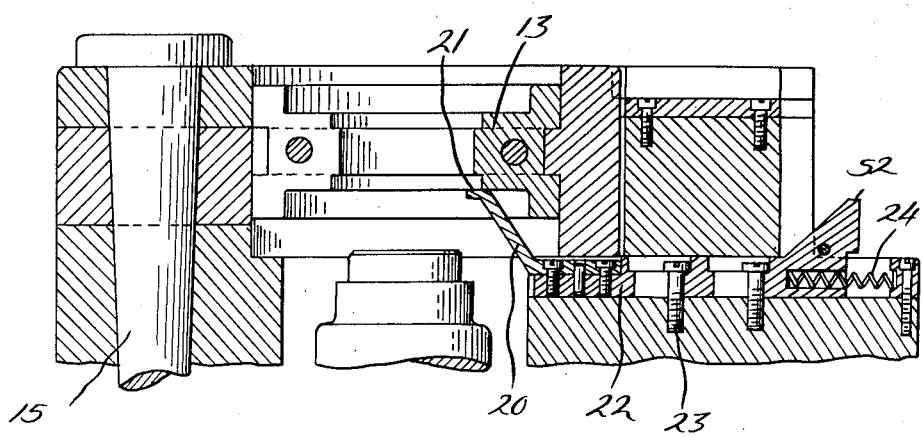
Figure 4 is a sectional view taken on the plane indicated by the line 4—4 of Figure 2.

Referring now to the operation of the punch and assuming that the several parts of the same are in the position thereof illustrated in Figure 1 wherein the finger 20 is in its innermost position illustrated more clearly in Figure 4 to support a bearing or like section within the part 13 of the holder, it will be noted that upon initial downward movement of the head 28 by the reciprocating plunger 29, the plates 51 slide over the cooperating plates 53 on the respective sections of the holder to rigidly clamp the swinging section 14 to the fixed section 13 and thereby secure the bearing or like section in the holder. Continued downward movement of the head 28 causes the cam 55 to engage the cam 57 and retract the finger 20 against the action of the spring 24 to its inoperative position shown in Figure 5 out of the path of travel of the punch 26. Further downward movement of the head 28 causes the shoulder 41 to engage the wear plate 44 and to move the slide 38 downwardly to the position thereof illustrated in Figure 3. Movement of the slide 38, as specified above, effects a rocking movement of the rocker 32 about the shaft 33 in a counter-clockwise direction causing an upward movement of the end 34 of the rocker 32 and since the latter end of the rocker is connected to the slide 30, the latter, together with the punch 26, is also moved upwardly. Inasmuch as the punches 25 and 26 are arranged coaxially in alignment with the bearing or like section supported in the holder and since the head 28 and slide 30 are mounted respectively above and below the holder, it will be apparent that downward movement of the head 28 and upward movement of the slide 30, as previously stated, causes the punches 25 and 26 to move in opposite directions into engagement with the ends of the bearing or like section in the holder to fashion the same. In the present instance, the particular configuration of the punches and the cooperating portions of the holder is such as to form radially extending flanges on the ends of the bearings or like section in the holder.

After the ends of the bearing or like section have been flanged as stated above, the head 28 is moved upwardly causing the cam 55 to disengage from the cam 57 and thereby release the work supporting finger to permit movement thereof inwardly toward its operative work supporting position by the spring 24. Continued upward movement of the head releases the clamping action on the holder and moves the punches to their inoperative position shown in Figure 1. The handle 17 is then grasped and the section 14 swung to the position of the same shown in Figure 6 whereupon the completed bearing or like section may be readily removed from the holder.

What we claim as our invention is:

1. A punch press for fashioning the opposite end portions of tubular blanks, comprising a reciprocable head, a punch fixed to the head for movement as a unit therewith, a second punch arranged in axial alignment with the punch aforesaid, means connecting said second punch to the head whereby movement of the latter in one direction causes a corresponding movement of said second punch in an opposite direction, and a holder for supporting a tubular blank between the said punches in axial alignment therewith.

2. A punch press having a work holder, a reciprocable head positioned to one side of the work holder, a punch carried by said head for engaging one side of the work supported in the holder upon movement of the head toward the latter, a cooperating punch mounted upon the opposite side of the holder in axial alignment with the punch aforesaid and movable toward and away from the latter, and means establishing an operative connection between said second punch and head for moving the latter punch toward the first-named punch upon movement of the head toward the holder.

3. A punch press having a pair of cooperating coaxially arranged punches movable toward and away from each other, a work holder for supporting the work between the punches, a reciprocable head connected to one of said punches for moving the same into engagement with one side of the work, means operable in dependence upon movement of the punch aforesaid into engagement with the adjacent side of the work to move the other punch into engagement with the opposite side of the work said means including a lost motion connection between said second-named punch and head providing for limited movement of the head relative to the second-named punch.

4. A punch press having a pair of coaxially arranged punches movable toward and away from each other, a work holding clamp for positioning the work between the punches, a reciprocable head operatively connected to said punches for moving the same toward each other into engagement with opposite sides of the work supported in the clamp, and means operable in timed relation to the movement of said punches into engagement with the work for actuating said work holding clamp to rigidly secure the work in position.

5. A punch press having a pair of coaxially arranged punches movable toward and away from each other, a work holding clamp comprising a plurality of relatively movable sections cooperating in one position to clamp the article to be fashioned between the punches, a reciprocable head for moving said punches toward each other into engagement with opposite sides of the article aforesaid, and means also operated by said head for securing the sections of the clamp in a position wherein the article to be punched is rigidly clamped thereby prior to movement of the punches into engagement with the article.

6. A punch press having a work holder formed of a plurality of sections cooperating in one position to clamp an article to be punched in place and in another position to release said article, a reciprocable head positioned to one side of the work holder, a punch carried by said head for movement thereby toward and away from the work supported in said holder, a second cooperating punch arranged in axial alignment with the punch aforesaid on the opposite side of the holder, means operable upon movement of the first-named punch into engagement with one side of the article in the holder to move said second-named punch into engagement with the opposite side of said article, said means including a lost motion connection between said second-mentioned punch and reciprocable head providing for restricted movement of the head relative to said second-named punch, and means operable during the interval of relative movement of the head and second-named punch for actuating said holder to rigidly clamp the article to be punched in place.

7. A punch press having a pair of coaxially arranged punches movable toward and away from each other, a reciprocable head connected to one of said punches for actuating the same, a slide connected to the other of said punches, a rocker having one end connected to said slide and having the opposite end operatively connected to said head.

8. A punch-press having a pair of coaxially arranged punches movable toward and away from each other, a reciprocable head connected to one of said punches for actuating the same, means operatively connecting the other punch to the head, and means operated by said head in timed relation to movement of said punches toward each other for clamping an article to be punched between said punches.

9. A punch press having a pair of coaxially aligned punches movable toward and away from each other, a work holder interposed between said punches and having relatively movable sections cooperating in their operative positions to clamp a blank to be fashioned between and in alignment with said punches, means normally arranged in predetermined relationship to said holder for supporting and positioning a blank between the sections aforesaid prior to relative movement of the latter into clamping engagement with the blank, and means for actuating said punches, holder and means aforesaid in timed relation to each other.

10. A punch press having a pair of coaxially aligned punches movable toward and away from each other, a work holder interposed between said punches and having relatively movable sections cooperating in their operative positions to clamp a blank to be fashioned between and in alignment with said punches, means normally arranged in the path of travel of one of said punches and operable to support and position a blank relative to the holder prior to movement of the sections of the latter into clamping engagement with a blank, a reciprocable head operatively connected to both said punches for moving the same toward each other into engagement with opposite ends of the blank, means operated by said head for actuating the holder to clamp a blank therein prior to engagement of the punches with the blank, and means also operated by said head subsequent to the means aforesaid and prior to engagement of the punches with the blank for withdrawing said supporting and positioning means from the path of travel of the punch aforesaid.

11. A punch press having coaxially aligned punches movable toward and away from each other, a work holder for securing a blank to be fashioned between said punches and in alignment therewith, means normally arranged in the path of travel of one of said punches for initially supporting and positioning a blank in operative relationship to the holder prior to actuation of the latter to secure a blank therein, means for moving one of said punches relative to the other toward the blank, means operable by the means aforesaid during the interval of relative movement of said punches for actuating the holder to clamp the blank therein and for subsequently withdrawing said supporting and positioning means from the path of travel of the punch aforesaid, and a connection between said punches operable subsequent to the operation of said second-mentioned means for moving both said punches into engagement with the blank simultaneously.

12. A punch press having coaxially aligned punches movable toward and away from each other, a work holder comprising relatively movable cooperating sections for clamping a blank between said punches and in alignment therewith, means for moving one of the punches relative to the other toward the blank, means operable by the aforesaid means during the interval of relative movement of the punches for actuating said holder to clamp a blank therein, and a connection between said first-named means and second-mentioned punch operable to move the latter into engagement with the blank subsequent to the operation of the holder to clamp the blank therein.

13. A punch press having a pair of coaxially arranged punches movable toward and away from each other, a reciprocable head connected to one of said punches for actuating the same, means operatively connecting the other punch to the head, means for supporting a blank in a predetermined position between the aforesaid punches prior to actuation of the head to move said punches toward each other, and means operable in timed relation to the movement of the punches toward each other for securing the blank in the position aforesaid thereof and for withdrawing the supporting means from the path of travel of the punches.

14. A punch press having a pair of coaxially arranged punches movable toward and away from each other, a reciprocable head operatively connected to the punches for actuating the same, means movable to a position between the punches upon movement of the latter away from each other and operable to support a blank therebetween, and means operable in timed relation to movement of the punches toward each other for securing the blank in the aforesaid position thereof and for subsequently withdrawing said supporting means from the path of travel of the punches.

15. A punch press having a pair of coaxially arranged punches movable toward and away from each other, a reciprocable head operatively connected to said punches for actuating the same, means operatively connected to the reciprocable head for actuation thereby in timed relation to movement of the punches away from each other to assume a position between the punches for supporting a blank in operative relation to both the latter, and means also operated by said head in timed relation to movement of said punches toward each other for securing the blank in the aforesaid position thereof and for subsequently withdrawing the supporting means from the path of travel of the punches.

16. A punch press having opposed punches relatively movable toward and away from each other, a work holder for securing a blank to be fashioned between the punches and in alignment therewith, means for initially supporting a blank in operative relation to the holder prior to actuation of the latter to secure a blank therein, means for relatively moving the punches, and means operable by the aforesaid means during the interval of relative movement of the punches toward each other for actuating the holder to clamp the blank therein and for subsequently withdrawing said supporting means from engagement with the blank.

17. A punch press having opposed punches relatively movable toward and away from each other, a work holder for securing a blank to be fashioned between the punches and in alignment therewith, means for initially supporting a blank in operative relation to the holder prior to actuation of the latter to secure a blank therein, means for relatively moving the punches, means operable by the aforesaid means during the interval of relative movement of the punches toward each other for actuating the holder to clamp the blank therein and for subsequently withdrawing said supporting means from engagement with the blank, and means operable in timed relation to relative movement of the punches away from each other for automatically moving said supporting means into its blank supporting position.

18. A punch press having opposed punches relatively movable toward and away from each other, means for supporting an article to be punched between the punches in operative relation thereto, means for relatively moving the punches, means operable in timed relation to relative movement of the punches toward each other for clamping the article to be punched in the aforesaid position thereof, and means operable in timed relation to the actuation of said clamping means for withdrawing the supporting means from the position thereof between the punches.

19. A punch press having opposed punches relatively movable toward and away from each other, means for relatively moving said punches, means movable to a position between the punches in timed relation to relative movement of the latter in a direction away from each other for supporting an article to be punched in operative relation to the punches, means operable in timed relation to relative movement of the punches toward each other for clamping the article to be punched in the aforesaid position thereof, and means operable in timed relation to the operation of said clamping means for withdrawing said supporting means.

FRED C. JONES.
RICHARD W. FUNK.